United States Patent
Obata

(10) Patent No.: US 10,766,378 B2
(45) Date of Patent: Sep. 8, 2020

(54) ELECTRICALLY POWERED VEHICLE AND METHOD FOR CONTROLLING ELECTRICALLY POWERED VEHICLE

(71) Applicant: TOYOTA JIDOSHA KABUSHIKI KAISHA, Toyota-shi, Aichi-ken (JP)

(72) Inventor: Hiroyuki Obata, Nagoya (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 99 days.

(21) Appl. No.: 16/223,797

(22) Filed: Dec. 18, 2018

(65) Prior Publication Data

US 2019/0193588 A1 Jun. 27, 2019

(30) Foreign Application Priority Data

Dec. 21, 2017 (JP) ................. 2017-244924

(51) Int. Cl.
| | | |
|---|---|---|
| B60L 55/00 | (2019.01) | |
| H01M 10/48 | (2006.01) | |
| H01M 10/44 | (2006.01) | |
| B60L 50/13 | (2019.01) | |
| B60K 6/26 | (2007.10) | |

(52) U.S. Cl.
CPC ............. *B60L 55/00* (2019.02); *B60L 50/13* (2019.02); *H01M 10/443* (2013.01); *H01M 10/486* (2013.01); *B60K 6/26* (2013.01); *B60L 2210/40* (2013.01); *B60L 2240/14* (2013.01); *B60L 2240/545* (2013.01); *B60L 2250/28* (2013.01); *B60Y 2200/91* (2013.01); *B60Y 2200/92* (2013.01); *H01M 2220/20* (2013.01)

(58) Field of Classification Search
CPC ...... B60L 55/00; B60L 55/13; B60L 2210/40; B60L 2240/545; H01M 10/48; H01M 10/443; H01M 10/486; B60K 6/26
USPC ......................................... 701/22
See application file for complete search history.

(56) References Cited

U.S. PATENT DOCUMENTS

| | | | | |
|---|---|---|---|---|
| 2015/0002053 A1* | 1/2015 | Endo | ................... | B60L 15/2045 318/139 |
| 2016/0152150 A1* | 6/2016 | Taguchi | ................. | B60L 58/12 307/10.1 |
| 2016/0236581 A1* | 8/2016 | Tashiro | ................. | H01M 10/48 |
| 2019/0296297 A1* | 9/2019 | Liu | ........................ | H01M 10/04 |

FOREIGN PATENT DOCUMENTS

| | | |
|---|---|---|
| JP | 2005-094866 A | 4/2005 |
| JP | 2009-268345 A | 11/2009 |
| JP | 2012-227983 A | 11/2012 |

* cited by examiner

*Primary Examiner* — Tan Q Nguyen
(74) *Attorney, Agent, or Firm* — Sughrue Mion, PLLC

(57) ABSTRACT

An ECU is configured to perform output restriction control if first and second conditions are satisfied when a cell temperature is more than a threshold temperature determined based on a thermal destruction temperature of a sealing member. On the other hand, the ECU is configured not to perform the output restriction control if one of the first and second conditions is not satisfied even when the cell temperature is more than the threshold temperature. The first condition is satisfied when an acceleration time period is more than a predetermined time period. The second condition is satisfied when the temperature increase ratio of the cell is more than a restriction value.

5 Claims, 4 Drawing Sheets

| | CONTROL THRESHOLD VALUE | UPPER LIMIT VALUE |
|---|---|---|
| CELL TEMPERATURE TBi | Tx (Tx < Tmax) | Tmax |
| TEMPERATURE INCREASE RATIO ΔTBi | Ax (Ax < Amax) | Amax |
| ACCELERATION TIME PERIOD Δt | tx | — |

ELECTRICALLY POWERED VEHICLE AND METHOD FOR CONTROLLING ELECTRICALLY POWERED VEHICLE

This nonprovisional application is based on Japanese Patent Application No. 2017-244924 filed on Dec. 21, 2017 with the Japan Patent Office, the entire contents of which are hereby incorporated by reference.

BACKGROUND

Field

The present disclosure relates to an electrically powered vehicle and a method for controlling the electrically powered vehicle, in particular, an electrically powered vehicle including a motor configured to generate vehicle driving power and a secondary battery configured to supply electric power to the motor, as well as a method for controlling the electrically powered vehicle.

Description of the Background Art

Japanese Patent Laying-Open No. 2009-268345 discloses a charging device for a secondary battery pack. This charging device is configured to control charging current while monitoring a temperature of the secondary battery. Specifically, the temperature of the secondary battery is detected by a thermistor, and the temperature of the secondary battery is monitored. When the temperature of the secondary battery is increased to be more than or equal to a set temperature, the supply of the charging current to the secondary battery is halted. This prevents abnormal temperature increase in the secondary battery during the charging.

In recent years, in an electrically powered vehicle such as a hybrid vehicle or an electric vehicle, a battery used during traveling has attained a high output. It should be noted that in the case of the hybrid vehicle, the expression "traveling" includes: HV (Hybrid Vehicle) traveling in which traveling is performed using both a motor and an engine with the engine being operated; and EV (Electric Vehicle) traveling in which traveling is performed only using driving power from the motor. In the case of the electric vehicle having no engine, the expression "traveling" means the EV traveling.

In the electrically powered vehicle capable of high-output HV traveling/EV traveling ("EV traveling" in the case of the electric vehicle having no engine; the same applies to the description below), when accelerating the vehicle, a large amount of current is output from the secondary battery to the motor to result in great heat generation particularly at a terminal portion of the secondary battery. Accordingly, the temperature of the battery terminal portion may be increased abruptly. The increase of the temperature of the battery terminal portion may lead to thermal destruction of a sealing member for sealing a space between a case of the secondary battery and an electrode terminal.

Therefore, in order to avoid the thermal destruction of the sealing member, it is necessary to manage the temperature of the terminal portion of the secondary battery. When the temperature of the terminal portion is increased, the temperature can be restricted by restricting the battery output. However, if the battery output is always restricted in response to the temperature increase of the terminal portion, acceleration performance in the HV traveling/EV traveling is significantly restricted.

SUMMARY

The present disclosure has been made to solve such a problem, and has an object to provide an electrically powered vehicle and a method for controlling the electrically powered vehicle, by each of which acceleration performance in HV traveling/EV traveling can be secured as much as possible while preventing thermal destruction of a sealing member provided at a terminal portion of a secondary battery.

An electrically powered vehicle according to the present disclosure includes: a motor configured to generate vehicle driving power; a secondary battery configured to supply electric power to the motor; a temperature sensor configured to detect a temperature of the secondary battery; and a controller configured to control an output of the secondary battery. The controller is configured to perform output restriction control to restrict the output of the secondary battery if a first condition and a second condition are satisfied when the temperature (TBi) of the secondary battery is more than a threshold temperature (Tx), the threshold temperature being determined based on a thermal destruction temperature of a sealing member configured to seal a space between a case of the secondary battery and an electrode terminal. On the other hand, the controller is configured not to perform the output restriction control if at least one of the first condition and the second condition is not satisfied even when the temperature of the secondary battery is more than the threshold temperature. Here, the first condition is satisfied when an acceleration time period ($\Delta t$) indicating a time period of continuous acceleration of the electrically powered vehicle is more than a predetermined time period (tx). The second condition is satisfied when a temperature increase ratio ($\Delta TBi$) of the secondary battery is more than a predetermined restriction value (Ax).

Further, a control method according to the present disclosure is a method for controlling an electrically powered vehicle. The electrically powered vehicle includes: a motor configured to generate vehicle driving power; a secondary battery configured to supply electric power to the motor; and a temperature sensor configured to detect a temperature of the secondary battery. The control method includes: determining whether or not the temperature of the secondary battery is more than a threshold temperature, the threshold temperature being determined based on a thermal destruction temperature of a sealing member configured to seal a space between a case of the secondary battery and an electrode terminal; determining whether or not an acceleration time period indicating a time period of continuous acceleration of the electrically powered vehicle is more than a predetermined time period; determining whether or not a temperature increase ratio of the secondary battery is more than a predetermined restriction value; and performing output restriction control to restrict an output of the secondary battery if the acceleration time period is more than the predetermined time period and the temperature increase ratio of the secondary battery is more than the restriction value when the temperature of the secondary battery is more than the threshold temperature. Even when the temperature of the secondary battery is more than the threshold temperature, the output restriction control is not performed if the acceleration time period is less than or equal to the predetermined time period or if the temperature increase ratio of the secondary battery is less than or equal to the restriction value.

In each of the electrically powered vehicle and the method for controlling the electrically powered vehicle, when the temperature of the secondary battery is more than the threshold temperature determined based on the thermal destruction temperature of the sealing member, if the acceleration time period is more than the predetermined time period and the temperature increase ratio of the secondary battery is more than the restriction value, the output restriction control is performed. Accordingly, the terminal portion of the secondary battery is suppressed from generating heat, thereby preventing the thermal destruction of the sealing member. On the other hand, even when the temperature of the secondary battery is more than the threshold temperature, the output restriction control is not performed if the acceleration time period is less than or equal to the predetermined time period or if the temperature increase ratio of the secondary battery is less than or equal to the restriction value. Accordingly, the acceleration performance in the HV traveling/EV traveling can be secured as much as possible by reducing the opportunity of restricting the output of the secondary battery.

Based on an upper limit temperature (Tmax) of the secondary battery, the threshold temperature (Tx) is set to a temperature lower than the upper limit temperature. Based on the thermal destruction temperature of the sealing member, the upper limit temperature is set to a temperature lower than the thermal destruction temperature.

Accordingly, the thermal destruction of the sealing member can be prevented securely.

The predetermined time period (tx) and the restriction value (Ax) are set in accordance with the upper limit temperature in order to avoid the temperature of the secondary battery from becoming more than the upper limit temperature (Tmax).

Accordingly, the predetermined time period and the restriction value can be set appropriately to such an extent that the temperature of the secondary battery is not more than the upper limit temperature, so as to avoid the output restriction control from being performed unnecessarily.

Based on an upper limit value (Amax) of the temperature increase ratio (ΔTBi) of the secondary battery, the restriction value (Ax) is set to a value smaller than the upper limit value. The threshold temperature (Tx) is changeable to such an extent that the threshold temperature is not more than the upper limit temperature (Tmax). Moreover, the upper limit value of the temperature increase ratio is set to be smaller as the threshold temperature is higher.

Accordingly, the restriction value can be set appropriately to such an extent that the temperature of the secondary battery is not more than the upper limit temperature, so as to avoid the output restriction control from being performed unnecessarily.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
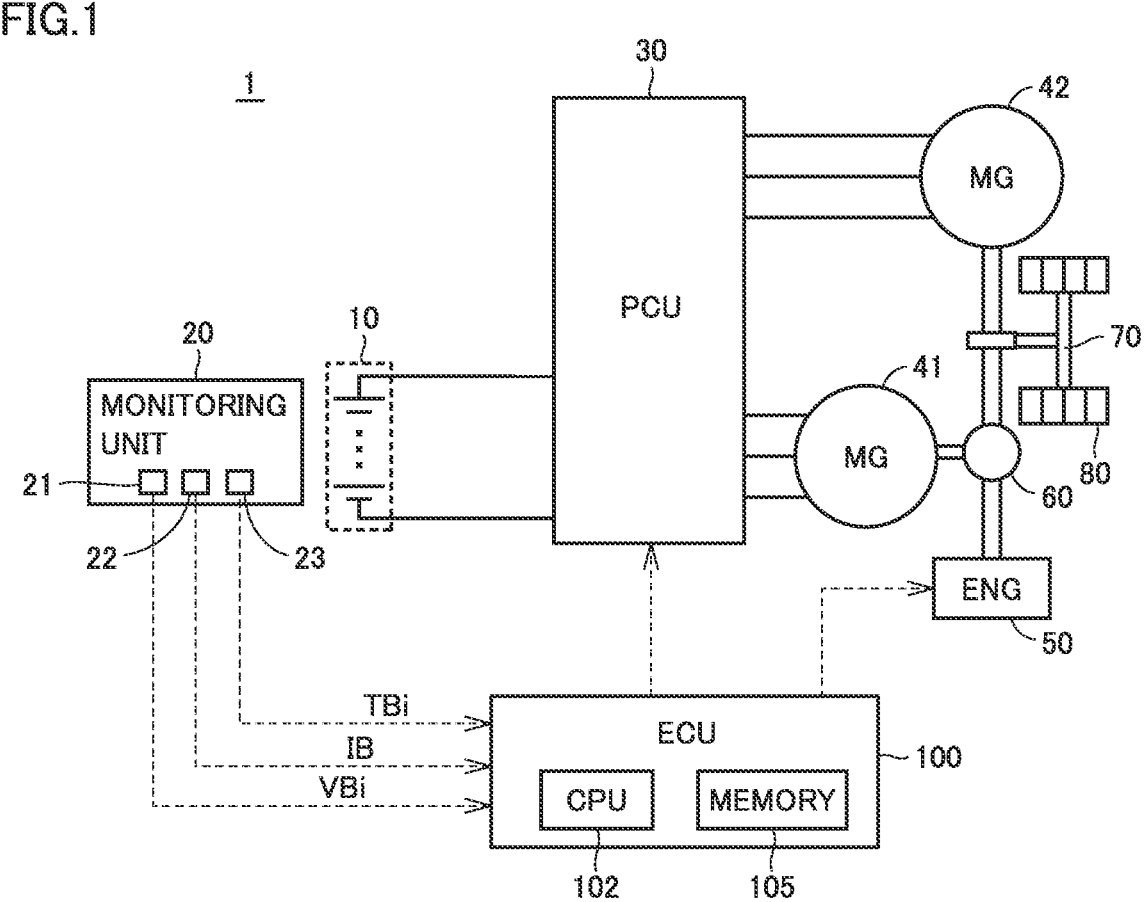
FIG. 1 schematically shows a configuration of an electrically powered vehicle according to the present embodiment.

The following describes embodiments of the present disclosure with reference to figures in detail. It should be noted that the same or corresponding portions in the figures are given the same reference characters and are not described repeatedly.

<Configuration of Electrically Powered Vehicle>

FIG. 1 schematically shows a configuration of an electrically powered vehicle according to the present embodiment. It should be noted that in the description below, it will be representatively described that the electrically powered vehicle is a hybrid vehicle; however, the electrically powered vehicle according to the present embodiment is not limited to the hybrid vehicle and may be an electric vehicle having no engine.

With reference to FIG. 1, an electrically powered vehicle 1 includes: an assembled battery 10; a monitoring unit 20; a power control unit (hereinafter, referred to as "PCU") 30; motor generators (hereinafter, referred to as "MG") 41, 42; an engine 50; a power split device 60; a drive shaft 70; driving wheels 80; and an electronic control unit (hereinafter, referred to as "ECU") 100.

Assembled battery 10 is configured to include a plurality of secondary cells (hereinafter, referred to as "cells"). For example, some cells are collected to construct a module, and a plurality of such modules are further collected to construct assembled battery 10. Assembled battery 10 stores electric power for driving MGs 41, 42, and can supply electric power to MGs 41, 42 through PCU 30. Moreover, during generation of electric power by MGs 41, 42, assembled battery 10 receives the generated power via PCU 30 and is accordingly charged.

Monitoring unit 20 includes a voltage sensor 21, a current sensor 22, and a temperature sensor 23. Voltage sensor 21 detects voltage VBi of each cell (or a collection of a plurality of cells connected in parallel) of assembled battery 10. Current sensor 22 detects charging/discharging current IB of assembled battery 10. Temperature sensor 23 detects a temperature (hereinafter, also referred to as "cell temperature") TBi of each cell. For example, temperature sensor 23 is installed on the upper surface of the cell to detect cell temperature TBi. Each sensor outputs a signal indicating a detection result to ECU 100.

In accordance with a control signal from ECU 100, PCU 30 performs bidirectional power conversion between assembled battery 10 and each of MGs 41, 42. PCU 30 is configured to separately control respective states of MGs 41, 42, and can bring MG 41 into a regeneration (power generation) state and can bring MG 42 into a power running state, for example. For example, PCU 30 is configured to include: two inverters provided to correspond to MGs 41, 42; and a converter configured to boost DC voltage supplied to each inverter to be more than or equal to the output voltage of assembled battery 10.

Each of MGs 41, 42 is an AC rotating electrical machine, such as a three-phase AC synchronous motor including a rotor having a permanent magnet embedded therein. MG 41 is mainly used as a power generator driven by engine 50 via power split device 60. The electric power generated by MG 41 is supplied to MG 42 or assembled battery 10 through PCU 30.

MG 42 is mainly operated as a motor, and drives driving wheels 80. MG 42 receives at least one of the electric power from assembled battery 10 and the electric power generated by MG 41, and is driven therewith. The driving power of MG 42 is transmitted to drive shaft 70. On the other hand, upon braking of the vehicle or upon reduced acceleration on a downhill road, MG 42 operates as a power generator to perform regenerative power generation. The electric power generated by MG 42 is supplied to assembled battery 10 through PCU 30.

Engine 50 is an internal combustion engine configured to output motive power by converting (i) combustion energy resulting from combustion of an air-fuel mixture of air and fuel into (ii) kinematic energy for a kinematic element such as a piston or a rotor. Power split device 60 includes a planetary gear mechanism having three rotation axes of a sun gear, a carrier, and a ring gear, for example. Power split device 60 splits the motive power output from engine 50 into motive power for driving MG 41 and motive power for driving driving wheel 80.

ECU 100 is configured to include a CPU (Central Processing Unit) 102, a memory (ROM (Read Only Memory) and RAM (Random Access Memory)) 105, and an input/output port (not shown) configured to send/receive various types of signals. Based on the signal received from each sensor and program and map stored in memory 105, ECU 100 is configured to control engine 50 and PCU 30 so as to perform various types of control for a traveling state of the vehicle, charging and discharging of assembled battery 10, and the like. It should be noted that these various types of control are not limited to a process performed by software and may be a process performed by dedicated hardware (electronic circuit) constructed therefor.

Figure 2:
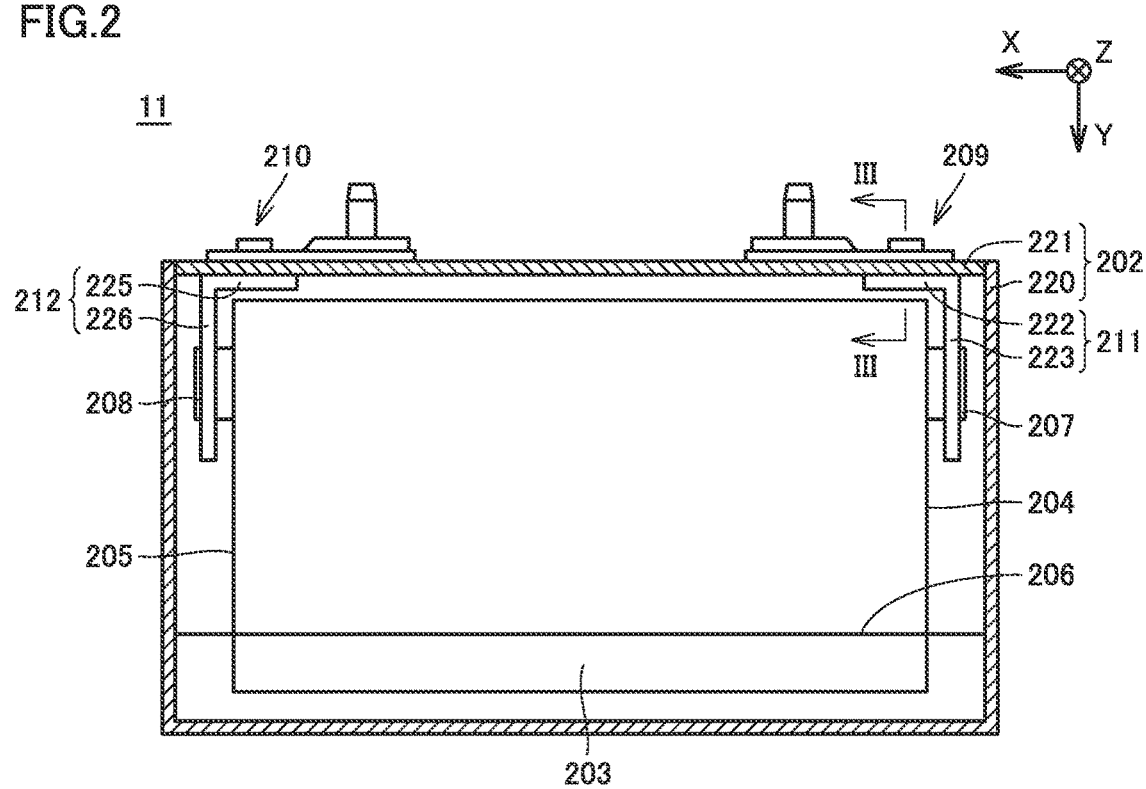
FIG. 2 is a cross sectional view showing an exemplary configuration of each cell included in an assembled battery shown in FIG. 1.

FIG. 2 is a cross sectional view showing an exemplary configuration of each cell 11 included in assembled battery 10 shown in FIG. 1. With reference to FIG. 2, cell 11 includes a housing case 202, an electrode assembly 203, an electrolyte solution 206, a positive electrode terminal portion 209, a negative electrode terminal portion 210, a positive electrode collector terminal 211, and a negative electrode collector terminal 212. A positive electrode collector 207 is formed on a side surface 204 of electrode assembly 203, and a negative electrode collector 208 is formed on a side surface 205 of electrode assembly 203. Electrode assembly 203, positive electrode collector terminal 211, and negative electrode collector terminal 212 are stored in housing case 202, and electrolyte solution 206 is provided in housing case 202.

Housing case 202 includes a case main body 220 and a cover 221. Case main body 220 is provided with an opening that opens upward. Cover 221 is disposed to close the opening of case main body 220, and is welded to case main body 220. Positive electrode terminal portion 209 and negative electrode terminal portion 210 are provided at cover 221.

Electrode assembly 203 is configured to include a plurality of positive electrode sheets, a plurality of separators, and a plurality of negative electrode sheets (each not shown). Electrode assembly 203 is formed by alternately layering the positive electrode sheets and the negative electrode sheets with the separators being interposed therebetween.

Positive electrode collector 207 is formed by layering respective end portions of the positive electrode sheets, and constitutes the positive electrode of electrode assembly 203. Negative electrode collector 208 is formed by layering respective end portions of the negative electrode sheets, and constitutes the negative electrode of electrode assembly 203.

Positive electrode collector terminal 211 includes a seating portion 222 and a leg portion 223. Seating portion 222 is disposed above electrode assembly 203 (−Y direction of electrode assembly 203). On the upper surface of seating portion 222, a positive electrode terminal, which extends to outside of housing case 202 via a hole (not shown) formed in cover 221, is formed at positive electrode terminal portion 209.

Negative electrode collector terminal 212 includes a seating portion 225 and a leg portion 226. Seating portion 225 is disposed above electrode assembly 203 (−Y direction of electrode assembly 203). On the upper surface of seating portion 225, a negative electrode terminal, which extends to outside of housing case 202 via a hole (not shown) formed in cover 221, is formed at negative electrode terminal portion 210.

Figure 3:
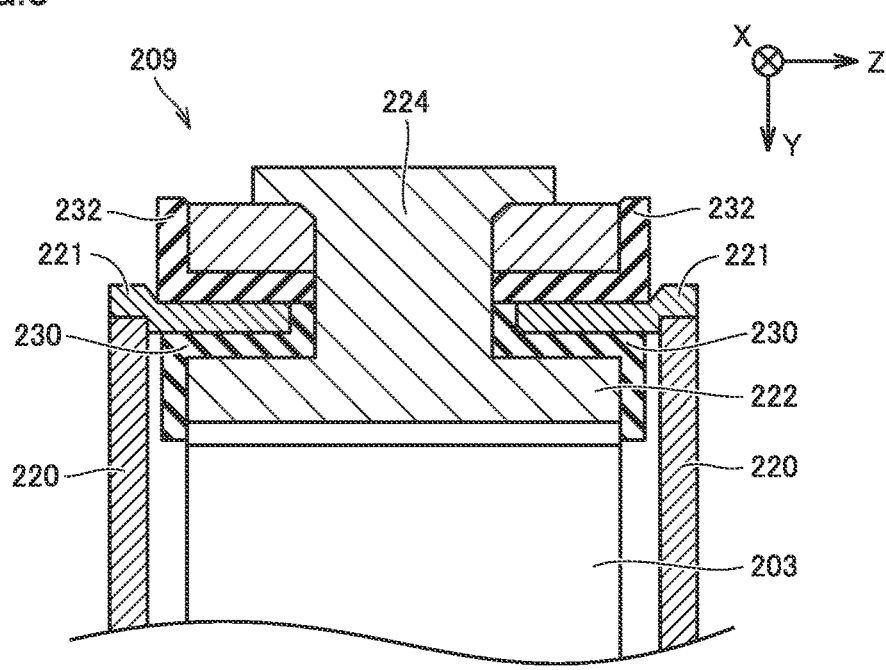
FIG. 3 is a cross sectional view of a positive electrode terminal portion shown in FIG. 2.

FIG. 3 is a cross sectional view of positive electrode terminal portion 209 shown in FIG. 2. Although not shown particularly, the configuration of negative electrode terminal portion 210 is the same as the configuration of positive electrode terminal portion 209 indicated below. With reference to FIG. 3, in positive electrode terminal portion 209, a positive electrode terminal 224 is formed to extend from seating portion 222 of positive electrode collector terminal 211 to outside of the case via the hole formed in cover 221, and sealing members 230, 232 are provided to seal a space between cover 221 and positive electrode terminal 224.

Each of sealing members 230, 232 is composed of a resin, a rubber, or the like, each of which has an electric insulation property. For example, each of sealing members 230, 232 is composed of a fluororesin such as tetrafluoroethylene-perfluoroalkyl vinyl ether copolymer (PFA). Each of sealing members 230, 232 is provided in a space between cover 221 and positive electrode terminal 224 to insulate cover 221 and positive electrode terminal 224 and secure the sealing at positive electrode terminal portion 209.

It should be noted that although not shown particularly, similar sealing members are provided also at negative electrode terminal portion 210, and the sealing members insulate cover 221 and the negative electrode terminal and secure the sealing at negative electrode terminal portion 210.

<Explanation of Output Restriction Control>

In recent years, an electrically powered vehicle capable of the HV traveling/EV traveling has attained high-output HV traveling/EV traveling. Also in electrically powered vehicle 1 according to the present embodiment, such high-output HV traveling/EV traveling is attained by attaining high outputs of assembled battery 10 and MGs 41, 42.

In such an electrically powered vehicle, a large amount of current is output from the assembled battery to the motor during acceleration of the vehicle to result in great heat generation particularly at the terminal portion of the cell. Accordingly, the temperature of the cell terminal portion may be increased abruptly. The increase of the temperature of the cell terminal portion may lead to thermal destruction of each sealing member for sealing the space between the housing case of the cell and the electrode terminal.

Accordingly, it is necessary to manage the temperature of the cell terminal portion in order to avoid the thermal destruction of the sealing member. When the temperature of the cell terminal portion is increased, the temperature can be restricted by restricting the battery output. However, if the battery output is always restricted in response to the temperature increase of the cell terminal portion, acceleration performance in the HV traveling/EV traveling is significantly restricted.

To address this, in electrically powered vehicle 1 according to the present embodiment, ECU 100 is configured to perform control (output restriction control) to restrict the output of assembled battery 10 if an acceleration time period (Δt) of the vehicle is more than a predetermined time period (tx) and an increase ratio (ΔTBi) of cell temperature TBi is more than a restriction value (Ax) when cell temperature TBi is more than a threshold temperature (Tx), which is determined based on the thermal destruction temperature of each of sealing members 230, 232 (FIG. 3).

Accordingly, positive electrode terminal portion 209 and negative electrode terminal portion 210 of assembled battery 10 are suppressed from generating heat, thereby preventing the thermal destruction of each of sealing members 230, 232. On the other hand, even when cell temperature TBi is more than the threshold temperature (Tx), the output restriction control by ECU 100 is not performed if the acceleration time period (Δt) is less than or equal to the predetermined time period (tx) or if the increase ratio (ΔTBi) of cell temperature TBi is less than or equal to a restriction value (Ax). This reduces an opportunity of restricting the output of assembled battery 10, whereby acceleration performance in the HV traveling/EV traveling can be secured as much as possible.

Figures 4, 5:
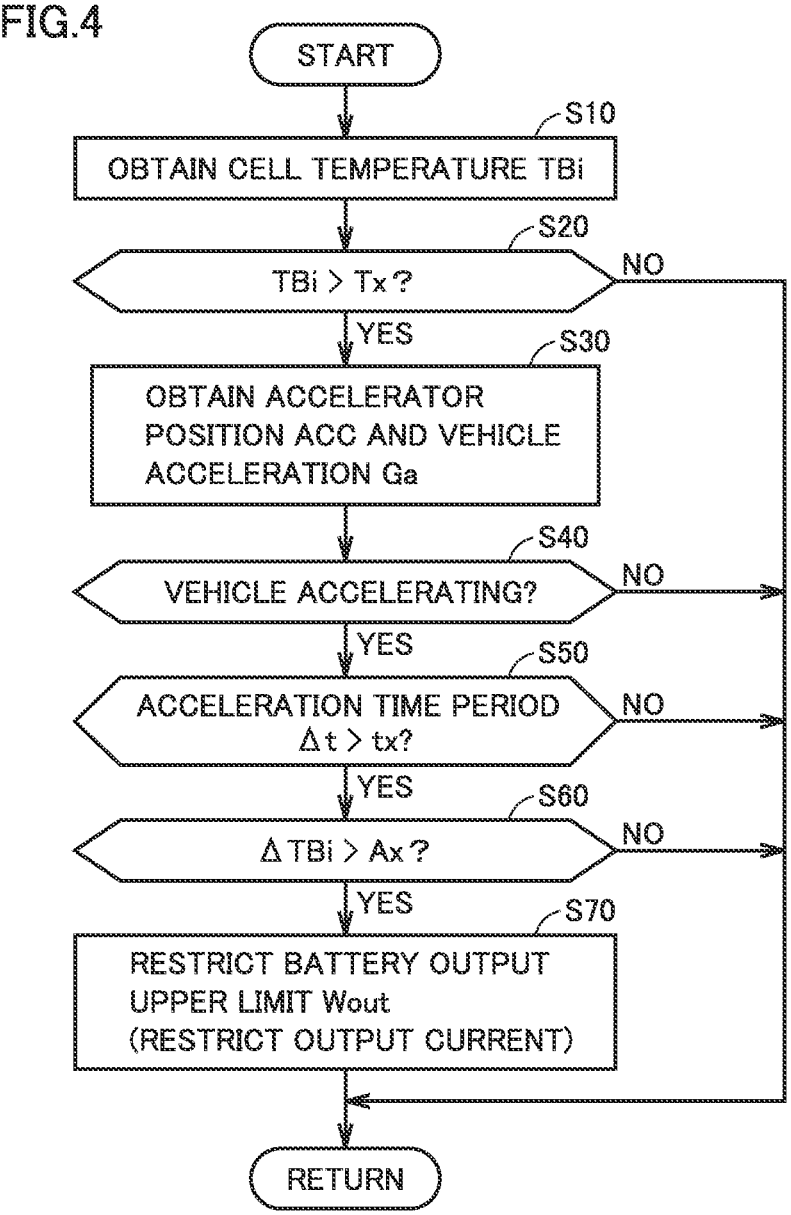
FIG. 4 is a flowchart showing an exemplary procedure of an output restriction process performed by an ECU.
FIG. 5 shows a control threshold value and an upper limit value.

FIG. 4 is a flowchart showing an exemplary procedure of the output restriction process performed by ECU 100. A series of processes shown in this flowchart are performed for each cell included in assembled battery 10, and are invoked from a main routine and performed whenever a predetermined time period has passed or when a predetermined condition is satisfied.

With reference to FIG. 4, ECU 100 obtains a detection value of cell temperature TBi from temperature sensor 23 (step S10). Then, ECU 100 determines whether or not obtained cell temperature TBi is higher than threshold temperature Tx (step S20). This threshold temperature Tx is determined based on a thermal destruction temperature that causes immediate destruction of each of sealing members 230, 232.

Specifically, threshold temperature Tx is set based on an upper limit temperature Tmax of cell temperature TBi, and is set to a temperature lower than upper limit temperature Tmax as shown in FIG. 5. For example, threshold temperature Tx is set to a temperature lower by a predetermined margin than upper limit temperature Tmax. Upper limit temperature Tmax, which represents the upper limit of the cell temperature with which the life of each of sealing members 230, 232 can be secured, is set to a temperature lower than the thermal destruction temperature of each of sealing members 230, 232. It should be noted that the thermal destruction temperature of each of sealing members 230, 232 is a temperature determined by a material of each of sealing members 230, 232.

When it is determined in step S20 that cell temperature TBi is less than or equal to threshold temperature Tx (NO in step S20), ECU 100 brings the process to RETURN without performing a series of subsequent processes. That is, in this case, the output restriction control in the below-described step S70 is not performed.

On the other hand, when it is determined in step S20 that cell temperature TBi is more than threshold temperature Tx (YES in step S20), ECU 100 obtains an accelerator position ACC corresponding to an operation amount of the accelerator pedal, and a vehicle acceleration Ga (step S30). It should be noted that accelerator position ACC can be detected by an accelerator pedal sensor (not shown), and vehicle acceleration Ga can be detected by an acceleration sensor (not shown).

Then, based on accelerator position ACC and vehicle acceleration Ga detected in step S30, ECU 100 determines whether or not electrically powered vehicle 1 is accelerating (step S40). As one example, it is determined that electrically powered vehicle 1 is accelerating, when accelerator position ACC is more than or equal to 30% and vehicle acceleration Ga is more than 0.

When it is determined that electrically powered vehicle 1 is accelerating (YES in step S40), ECU 100 determines whether or not acceleration time period Δt of the vehicle is more than predetermined time period tx (step S50). This acceleration time period Δt is a time period during which the acceleration continues after cell temperature TBi becomes more than threshold temperature Tx. Predetermined time period tx is set in accordance with upper limit temperature Tmax in order to avoid cell temperature TBi from becoming more than upper limit temperature Tmax. For example, predetermined time period tx is set to a time period for which cell temperature TBi can reach upper limit temperature Tmax when the acceleration is performed continuously for predetermined time period tx after cell temperature TBi becomes more than threshold temperature Tx.

When it is determined that acceleration time period Δt is less than or equal to predetermined time period tx in step S50 (NO in step S50), ECU 100 brings the process to RETURN without performing the series of subsequent processes. That is, in this case, the output restriction control in the below-described step S70 is not performed. This is to respond to the user's acceleration request in view of such an assumption that cell temperature TBi is less likely to reach upper limit temperature Tmax when acceleration time period Δt is a short acceleration time period of less than or equal to predetermined time period tx although cell temperature TBi is more than threshold temperature Tx.

When it is determined in step S50 that acceleration time period Δt is longer than predetermined time period tx (YES in step S50), ECU 100 determines whether or not increase ratio ΔTBi of the cell temperature is higher than predetermined restriction value Ax (step S60). This restriction value Ax is set in accordance with upper limit temperature Tmax in order to avoid cell temperature TBi from becoming more than upper limit temperature Tmax. For example, when an allowed time period until cell temperature TBi reaches upper limit temperature Tmax is defined, restriction value Ax can be set based on upper limit temperature Tmax and the allowed time period.

It should be noted that as shown in FIG. 5, restriction value Ax is set to a value smaller than upper limit value Amax of temperature increase ratio ΔTBi. Moreover, based on upper limit value Amax, restriction value Ax may be set to a value lower by a predetermined margin than upper limit value Amax. Moreover, when threshold temperature Tx can be set to be changeable to such an extent that threshold temperature Tx is not more than upper limit temperature Tmax, upper limit value Amax may be set such that upper limit value Amax is smaller as threshold temperature Tx is higher. Accordingly, for example, a margin to upper limit temperature Tmax of cell temperature TBi becomes smaller as threshold temperature Tx is higher; however, as threshold temperature Tx is higher, upper limit value Amax is smaller and restriction value Ax is accordingly smaller. Hence, cell temperature TBi can be appropriately suppressed from reaching upper limit temperature Tmax.

When it is determined in step S60 that temperature increase ratio ΔTBi of the cell is less than or equal to restriction value Ax (NO in step S60), ECU 100 brings the process to RETURN without performing step S70. That is, also in this case, the output restriction control is not performed. This is to secure a battery output according to the request because when cell temperature TBi is more than threshold temperature Tx but temperature increase ratio ΔTBi is low, it takes time for cell temperature TBi to reach upper limit temperature Tmax.

On the other hand, when it is determined in step S60 that temperature increase ratio ΔTBi is higher than restriction value Ax (YES in step S60), ECU 100 performs the output restriction control (step S70). For example, when YES is selected in step S60, the output of assembled battery 10 is assumed as having reached a battery output upper limit Wout indicating the upper limit of the output of assembled battery 10. Hence, in this example, battery output upper limit Wout is restricted. Accordingly, the output current of assembled battery 10 is restricted, thereby restricting the output of assembled battery 10.

It should be noted that as described above, the series of processes shown in FIG. 4 are performed for each cell; however, the process of step S70 is performed for assembled battery 10. In other words, when the condition for performing the process of step S70 is satisfied in one of the plurality of cells included in assembled battery 10, the output of assembled battery 10 is restricted.

As described above, when cell temperature TBi is more than threshold temperature Tx (YES in step S20), if acceleration time period Δt is more than predetermined time period tx (YES in step S50) and temperature increase ratio ΔTBi is higher than restriction value Ax, the output restriction control is performed to restrict the output of assembled battery 10 (step S70).

On the other hand, even when cell temperature TBi is more than threshold temperature Tx (YES in step S20), if acceleration time period Δt is less than or equal to predetermined time period tx (NO in step S50) or if temperature increase ratio ΔTBi is less than or equal to restriction value Ax (NO in step S60), the output restriction control is not performed. Thus, in electrically powered vehicle 1 according to the present embodiment, acceleration performance in the HV traveling/EV traveling is secured as much as possible by reducing an opportunity of restricting the output of assembled battery 10 while considering an influence of heat over sealing members 230, 232.

Figure 6:
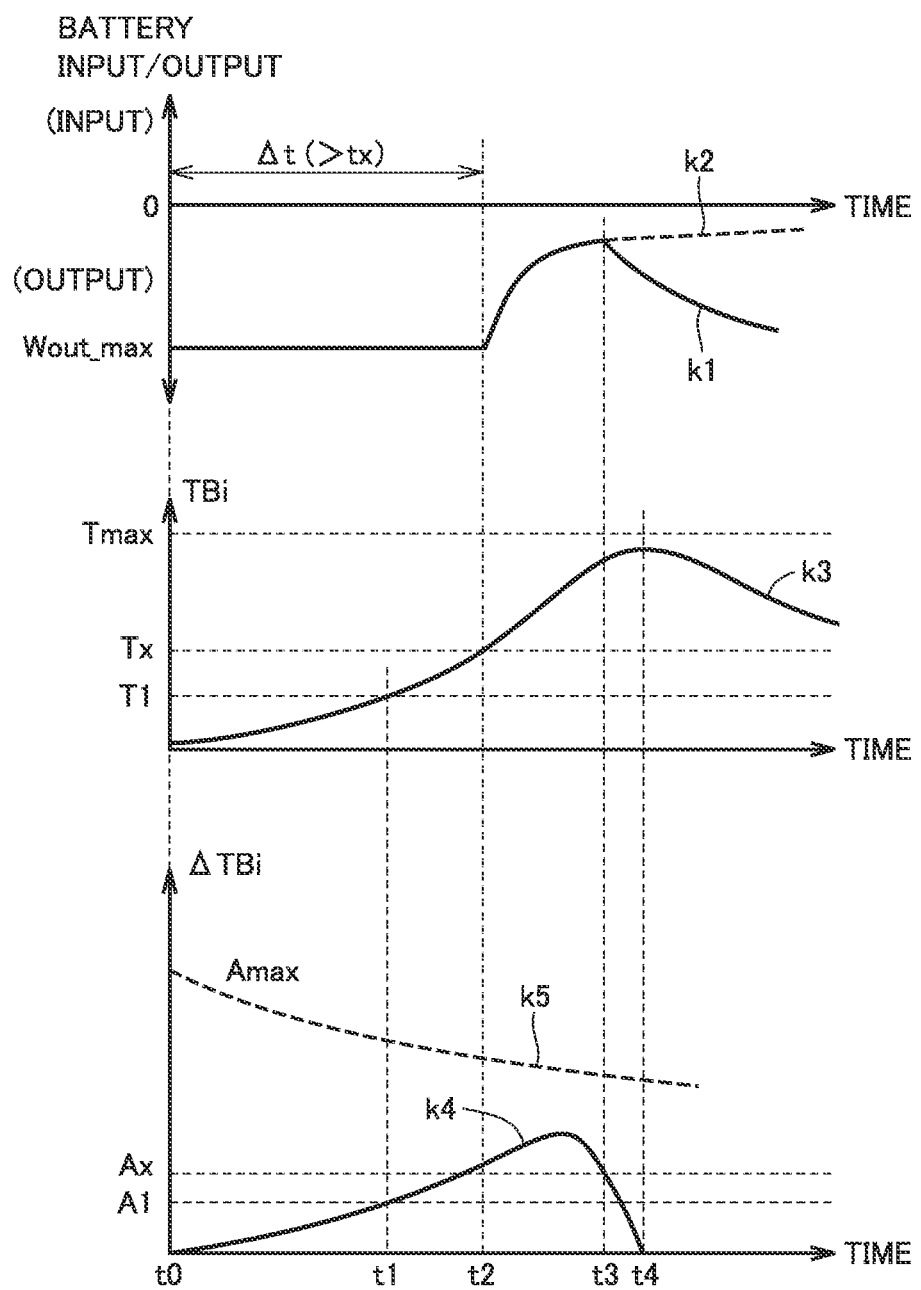
FIG. 6 shows exemplary transitions of input/output of the assembled battery, cell temperature, and temperature increase ratio.

FIG. 6 shows exemplary transitions of input/output of assembled battery 10, cell temperature TBi, and temperature increase ratio ΔTBi. In FIG. 6, a solid line k1 represents the output of assembled battery 10. As a comparative example, a dotted line k2 represents the output of assembled battery 10 if the process shown in FIG. 5 is not performed. A line k3 represents cell temperature TBi. A solid line k4 represents increase ratio ΔTBi of cell temperature TBi, and a dotted line k5 represents upper limit value Amax of temperature increase ratio ΔTBi.

With reference to FIG. 6, it is assumed that the vehicle is determined to be accelerating at time t0. At time t1, cell temperature TBi is T1, which is lower than threshold temperature Tx, and temperature increase ratio ΔTBi is A1, which is also lower than restriction value Ax.

At time t2, it is assumed that cell temperature TBi reaches threshold temperature Tx. On this occasion, acceleration time period Δt from time t0 is more than predetermined time period tx and temperature increase ratio ΔTBi is also more than restriction value Ax, so that the output of assembled battery 10 is restricted after time t2 (output restriction control).

By restricting the output of assembled battery 10, the temperature of cell temperature TBi is suppressed from being increased. When temperature increase ratio ΔTBi becomes less than restriction value Ax at time t3, the restriction on the output of assembled battery 10 is eased, whereby the output of assembled battery 10 starts to be increased (solid line k1). As shown in the comparative example of dotted line k2, when the output restriction process shown in FIG. 4 according to the present embodiment is not performed, restriction on the output of assembled battery 10 can be continued (dotted line k2) because cell temperature TBi is more than threshold temperature Tx. As such, in the present embodiment, when cell temperature TBi is more than threshold temperature Tx but it can be determined that the influence of heat over sealing members 230, 232 is small (in the example of FIG. 6, temperature increase ratio ΔTBi<restriction value Ax), the output restriction control is not performed, whereby the battery output is secured (after time t3).

As described above, in the present embodiment, when cell temperature TBi is more than threshold temperature Tx determined based on the thermal destruction temperature of each of sealing members 230, 232 of cell 11, if acceleration time period Δt is more than predetermined time period tx and temperature increase ratio ΔTBi is more than restriction value Ax, the output restriction control is performed to restrict the output of assembled battery 10. Accordingly, the terminal portion of cell 11 is suppressed from generating heat, thereby preventing the thermal destruction of each of sealing members 230, 232. On the other hand, even when cell temperature TBi is more than threshold temperature Tx, the output restriction control is not performed if acceleration time period Δt is less than or equal to predetermined time period tx or if temperature increase ratio ΔTBi is less than or equal to restriction value Ax. Accordingly, the acceleration performance in the HV traveling/EV traveling can be secured as much as possible by reducing the opportunity of restricting the output of assembled battery 10.

It should be noted that in the above-described embodiment, when cell temperature TBi is more than threshold temperature Tx, if acceleration time period Δt is more than predetermined time period tx and temperature increase ratio ΔTBi is more than restriction value Ax, the output of assembled battery 10 is restricted; however, in addition to this, input (charging power) to assembled battery 10 may be also restricted.

Moreover, for a driver who frequently causes the above-described output restriction control, a basic battery output upper limit Wout (battery output upper limit Wout applied when the output restriction control is not performed) may be restricted in advance.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:
1. An electrically powered vehicle comprising:
a motor configured to generate vehicle driving power;
a secondary battery configured to supply electric power to the motor;
a temperature sensor configured to detect a temperature of the secondary battery; and a controller configured to control an output of the secondary battery, wherein the controller is configured to perform output restriction control to restrict the output of the secondary battery if a first condition and a second condition are satisfied when the temperature of the secondary battery is more than a threshold temperature, the threshold temperature being determined based on a thermal destruction temperature of a sealing member configured to seal a space between a case of the secondary battery and an electrode terminal, the controller is configured not to perform the output restriction control if at least one of the first condition and the second condition is not satisfied even when the temperature of the secondary battery is more than the threshold temperature, the first condition is satisfied when an acceleration time period indicating a time period of continuous acceleration of the electrically powered vehicle is more than a predetermined time period, and the second condition is satisfied when a temperature increase ratio of the secondary battery is more than a predetermined restriction value.

2. The electrically powered vehicle according to claim 1, wherein based on an upper limit temperature of the secondary battery, the threshold temperature is set to a temperature lower than the upper limit temperature, and based on the thermal destruction temperature, the upper limit temperature is set to a temperature lower than the thermal destruction temperature.

3. The electrically powered vehicle according to claim 2, wherein the predetermined time period and the restriction value are set in accordance with the upper limit temperature in order to avoid the temperature of the secondary battery from becoming more than the upper limit temperature.

4. The electrically powered vehicle according to claim 2, wherein based on an upper limit value of the temperature increase ratio, the restriction value is set to a value smaller than the upper limit value, the threshold temperature is changeable to such an extent that the threshold temperature is not more than the upper limit temperature, and the upper limit value is set to be smaller as the threshold temperature is higher.

5. A method for controlling an electrically powered vehicle, the electrically powered vehicle including
- a motor configured to generate vehicle driving power,
- a secondary battery configured to supply electric power to the motor, and
- a temperature sensor configured to detect a temperature of the secondary battery, the method comprising:

determining whether or not the temperature of the secondary battery is more than a threshold temperature, the threshold temperature being determined based on a thermal destruction temperature of a sealing member configured to seal a space between a case of the secondary battery and an electrode terminal;

determining whether or not an acceleration time period indicating a time period of continuous acceleration of the electrically powered vehicle is more than a predetermined time period;

determining whether or not a temperature increase ratio of the secondary battery is more than a predetermined restriction value; and performing output restriction control to restrict an output of the secondary battery if the acceleration time period is more than the predetermined time period and the temperature increase ratio is more than the restriction value when the temperature of the secondary battery is more than the threshold temperature, wherein even when the temperature of the secondary battery is more than the threshold temperature, the output restriction control is not performed if the acceleration time period is less than or equal to the predetermined time period or if the temperature increase ratio is less than or equal to the restriction value.

* * * * *